US012257886B2

(12) United States Patent
Pugh (10) Patent No.: US 12,257,886 B2
(45) Date of Patent: Mar. 25, 2025

(54) TRACK EXTENSION FOR A PASSENGER VEHICLE AND METHOD OF ASSEMBLY

(71) Applicant: THE BRAUN CORPORATION, Winamac, IN (US)

(72) Inventor: Michael R. Pugh, Winamac, IN (US)

(73) Assignee: The Braun Corporation, Winamac, IN (US)

( * ) Notice: Subject to any disclaimer, the term of this patent is extended or adjusted under 35 U.S.C. 154(b) by 522 days.

(21) Appl. No.: 17/670,882

(22) Filed: Feb. 14, 2022

(65) Prior Publication Data

US 2022/0268069 A1 Aug. 25, 2022

Related U.S. Application Data

(60) Provisional application No. 63/152,429, filed on Feb. 23, 2021.

(51) Int. Cl.
*B60J 5/06* (2006.01)
*E05D 13/00* (2006.01)
(Continued)

(52) U.S. Cl.
CPC ............... *B60J 5/06* (2013.01); *E05D 13/00* (2013.01); *E05D 15/165* (2013.01); *A61G 3/067* (2016.11);
(Continued)

(58) Field of Classification Search
CPC ..... E05D 15/165; E05D 13/00; E05D 15/101; E05D 15/1047; A61G 3/067;
(Continued)

(56) References Cited

U.S. PATENT DOCUMENTS 6,036,257 A * 3/2000 Manuel ............... E05D 15/1081
49/213
6,328,374 B1 * 12/2001 Patel ................... E05D 15/1047
49/213
(Continued)

FOREIGN PATENT DOCUMENTS

DE 10300158 3/2004
JP 6825321 B2 2/2021

OTHER PUBLICATIONS

International Search Report and Written Opinion of May 31, 2022 for PCT/US2022/016304.
(Continued)

*Primary Examiner* — Amy R Weisberg
*Assistant Examiner* — Denise Lynne Esquivel
(74) *Attorney, Agent, or Firm* — Daniel Tallitsch; Tyler Schultz (57) ABSTRACT

A track extender for a sliding door track of an OEM passenger vehicle having a passenger opening, and a door operatively coupled to a sliding mechanism configured to slide along the sliding door track of the OEM vehicle. The sliding door track includes a track channel extending from the passenger opening toward a rear portion of the vehicle, wherein the sliding door track includes a first end located toward the passenger opening and a second end located toward the rear portion of the vehicle. The track extender includes a track extension body located at the second end of the track wherein the track extension body defines an extension channel. The extension channel is aligned with the track to lengthen the track and to extend a travel distance of the sliding mechanism along the track and to increase a width of the passenger opening.

20 Claims, 8 Drawing Sheets

(51) Int. Cl.
*E05D 15/16* (2006.01)
*A61G 3/06* (2006.01)
*E05D 15/10* (2006.01)

(52) U.S. Cl.
CPC ....... *E05D 15/1047* (2013.01); *E05Y 2201/64* (2013.01); *E05Y 2900/531* (2013.01)

(58) Field of Classification Search
CPC .......... E05Y 2201/64; E05Y 2900/531; E05Y 2201/684; E05Y 2800/205; E05Y 2800/70; B60J 5/06
USPC ............................................ 296/155; 49/213
See application file for complete search history.

(56) References Cited

U.S. PATENT DOCUMENTS

| | | | | | |
|---|---|---|---|---|---|
| 6,932,417 | B2 * | 8/2005 | Barczynski | ................ | B60J 5/06 49/213 |
| 7,621,586 | B2 * | 11/2009 | Fischer | ...................... | B60J 5/06 296/155 |
| 7,641,261 | B2 * | 1/2010 | Rusnak | ............... | E05D 15/1047 49/449 |
| 7,650,670 | B2 * | 1/2010 | Baer | ........................ | E05D 7/04 16/236 |

OTHER PUBLICATIONS

International Search Report and Written Opinion of Aug. 2, 2022 for PCT/US2022/016304.

\* cited by examiner

TRACK EXTENSION FOR A PASSENGER VEHICLE AND METHOD OF ASSEMBLY

RELATED APPLICATIONS

This application claims the benefit of U.S. Provisional Patent Application Ser. No. 63/152,429, filed Feb. 23, 2021, the disclosure of which is hereby incorporated by reference in its entirety.

FIELD OF THE DISCLOSURE

The present application relates to a passenger vehicle for transporting one or more passengers, and more particularly to a modified passenger vehicle which is configured to provide access to the vehicle for a physically limited passenger.

BACKGROUND

Automobile manufacturers do not currently mass-produce passenger motor vehicles specifically designed to transport passengers having physical limitations, either as a driver or as a non-driving passenger. Consequently, mass-produced passenger vehicles are modified, or retrofitted, by a number of aftermarket companies dedicated to supplying vehicles to physically limited passengers. Such vehicles can be modified by removing certain parts or structures within a vehicle and replacing those parts with parts specifically designed to accommodate the physically limited passenger. For example, in one configuration, a van is retrofitted with a ramp to enable a physically limited individual using a wheelchair to enter and exit the vehicle without the assistance of another individual.

Other known products for retrofitting a vehicle, such as a van or sport utility vehicle, include wheel chair lifts, lift platforms, and lowered floor surfaces. In some instances, a door or door entry of an original equipment manufacturer (OEM) van is enlarged or otherwise modified to permit entry and exit of the physically limited individual through what is known as the assisted entrance. Once inside the van, the individual who uses the assisted entrance is located in a rear passenger compartment of the van adjacent to or behind the assisted entrance.

In one known retrofitted van, the sliding side door moves toward the back of the vehicle to open a passenger entrance as well as to provide access to a ramp located beneath the floor. In some vehicles, which are considered as viable candidates for retrofitting, the construction of the OEM vehicle requires significant modification to accommodate the addition of a ramp. Not only must a subfloor be added, but the door opening needs to be widened to provide access to a wheelchair. Consequently, what is needed is a modification to an OEM vehicle which widens the door opening and which reduces the number of changes required to retrofit the OEM vehicle to improve access to physically limited individuals.

SUMMARY

In one embodiment, a motor vehicle has a body defining a passenger opening and a door including a sliding mechanism to move the door from a closed position to an open position. The motor vehicle includes a track mounted to the body, the track defining a track channel and having a first end located toward the passenger opening and a second end located toward a rear of the vehicle. A track extension is located at the second end of the track. The track extension defines an extension channel, wherein the extension channel is aligned with the track channel to lengthen the track channel and to extend a travel distance of the sliding mechanism along the track.

In another embodiment, there is provided a method for retrofitting an original equipment manufactured vehicle having a body defining a passenger opening and a door including a sliding mechanism configured to move along a door track to move the door from a closed to an open position. The method includes providing a track extension and an opening in the body at an end of the door track, inserting the track extension into the opening, and attaching the track extension to the body to increase a length of the door track.

In a further embodiment, there is provided a track extender for an OEM passenger vehicle having a door coupled to a sliding mechanism configured to slide along a track, wherein the track includes a first end located toward a passenger opening of the vehicle and a second end located toward a rear portion of the vehicle. The track extender includes a track extension body located at the second end of the track, the track extension body defining an extension channel, wherein the extension channel is aligned with the track to extend a length of the track and to extend a travel distance of the sliding mechanism along the track to the track extension body.

In yet another embodiment of the present disclosure, a motor vehicle includes a body, a door including a coupling mechanism to move the door relative to the body between a closed position and an open position, and a track assembly defining a channel. The channel has a first end and a second end. A track extension is coupled at the second end of the channel, where the track extension defines an extension channel configured to be aligned with the channel of the track assembly. The extension channel defines a third end such that the coupling mechanism is configured to move along the channel and extension channel, the coupling mechanism moving from the second end of the channel to the third end of the extension channel to increase a distance of travel of the door relative to the body.

In one example of this embodiment, the track extension comprises an extension body having a top flange and a bottom flange, the extension channel being located between the top flange and the bottom flange. In a second example, the extension body comprises a curvature at a location between the second end and the third end. In a third example, the track extension comprises a front portion having a generally planar surface, the front portion defining the third end of the extension channel. In a fourth example, the track extension comprises a shelf disposed between the front portion and the bottom flange, the shelf defining a surface which is generally parallel with an upper surface of the bottom flange.

In a fifth example, the top flange comprises a rim disposed generally parallel to the upper surface of the bottom flange. In a sixth example, the track extension comprises a plurality of apertures configured to receive one or more connectors for coupling the track extension to the body. In a seventh example, the body comprises an opening for receiving the track extension. In another example, the track extension comprises an alignment portion located at an end of the track extension opposite the third end, the alignment portion being positioned below the track assembly. In a further example, the alignment portion comprises a hook portion configured to engage the track assembly near the second end of the channel.

In an alternative embodiment, a method is provided of modifying a vehicle having a body, a door, a door opening formed in the body, a door track having a first end and a second end, and a coupling mechanism configured to move along the door track to move the door between a closed position and an open position. The method includes providing a track extension including an extension body, a top flange, a bottom flange, and an extension channel, inserting the track extension into an opening formed in the body of the vehicle, aligning the track extension with the door track, and coupling the track extension to the body to form a continuous channel between the door track and the extension channel.

In one example of this embodiment, the method includes positioning an alignment portion of the extension body below a portion of the door track. In another example, the coupling step comprises abutting a ledge portion of the bottom flange with the second end of the door track. In a further example, the coupling step comprises engaging a hook portion of the alignment portion with the second end of the door track. In yet another example, the coupling step comprises positioning a projecting portion of the top flange over a portion of the door track.

In a further embodiment of the present disclosure, a motor vehicle includes a body including an opening for access to an interior thereof and a door for selectively covering the opening. The door is configured to move relative to the body between a closed position and an open position. The vehicle includes a track assembly having a first end and a second end such that the door is in the closed position when located at the first end and the door being in a partially open position when located at the second end. The vehicle also includes a track extension coupled to the second end of the track assembly such that the track extension is aligned with the track assembly to enable a smooth transition of the door between the track assembly and the track extension. The door is in the open position when located at a terminating end of the track extension.

In one example of this embodiment, the opening includes a first width when the door is in the partially open position and a second width when the door is in the open position, the second width being greater than the first width. In another example, the track assembly is formed in the body and the track extension is disposed within an opening formed in the body. In a further example, the track extension comprises an extension body having a top flange and a bottom flange, the track extension defining a first channel located between the top flange and the bottom flange. In yet a further example, the track assembly defines a second channel between the first end and the second end, the first channel and second channel being aligned and generally coplanar with one another.

BRIEF DESCRIPTION OF THE DRAWINGS

The above-mentioned aspects of the present disclosure and the manner of obtaining them will become more apparent and the disclosure itself will be better understood by reference to the following description of the embodiments of the disclosure, taken in conjunction with the accompanying drawings, wherein.

DETAILED DESCRIPTION

The embodiments of the present disclosure described below are not intended to be exhaustive or to limit the disclosure to the precise forms disclosed in the following detailed description. Rather, the embodiments are chosen and described so that others skilled in the art may appreciate and understand the principles and practices of the present disclosure.

Figure 1:
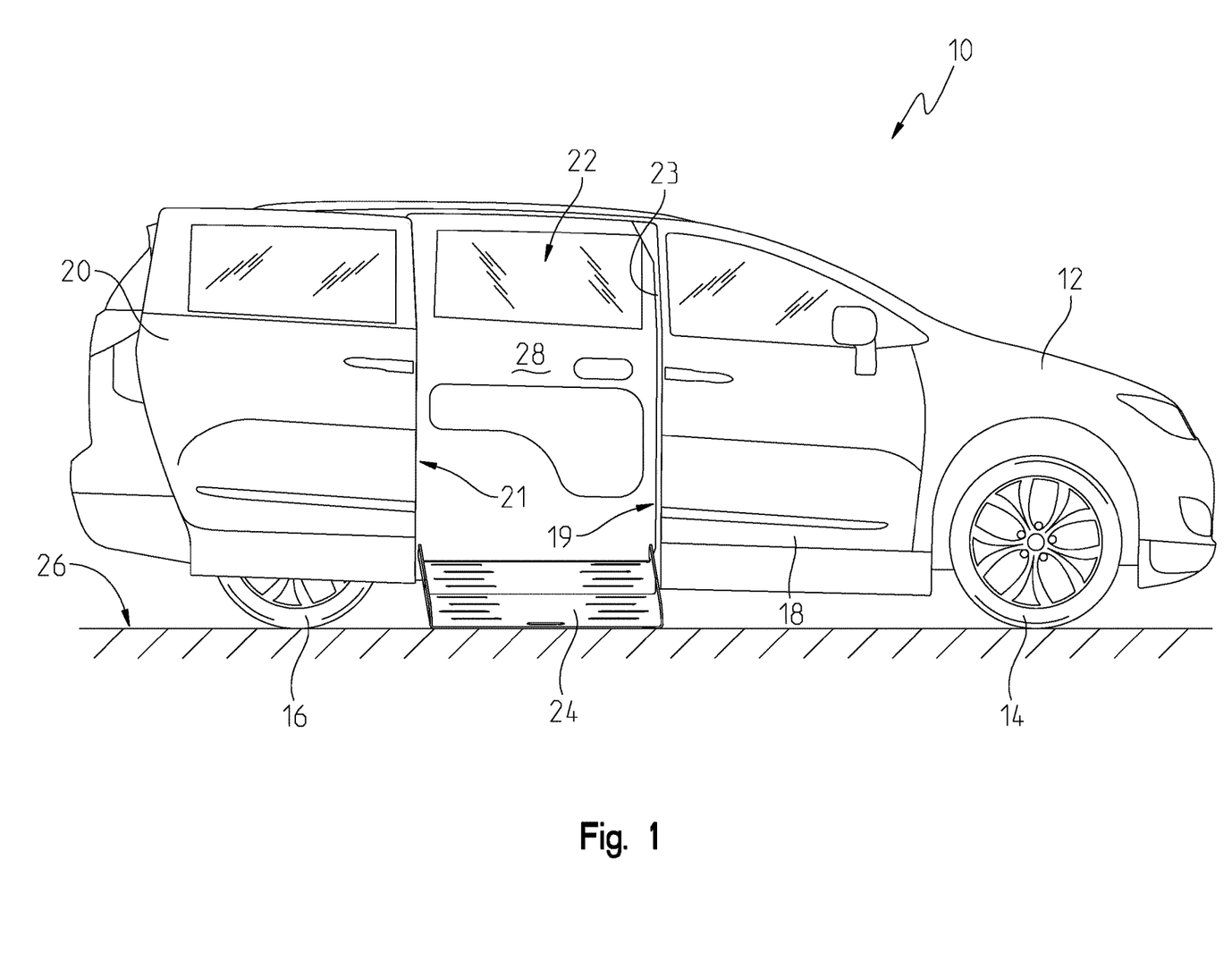
FIG. 1 illustrates an elevational side view of a passenger vehicle including an access ramp.

FIG. 1 illustrates a vehicle 10, commonly identified as a passenger or transport van, available from any number of United States and foreign manufacturers. In the illustrated embodiment, the vehicle 10 includes a unibody construction, but other vehicles having a frame on body construction, are also included in the present disclosure. Consequently, the use of vehicle herein includes all types and kinds of vehicles with a body on frame construction, a unibody construction, or other constructions. In addition, while the passenger van 10 is illustrated in FIG. 1, the present disclosure is directed to all passenger or transport vehicles capable of carrying one or more passengers.

The vehicle 10 includes a body 12 operatively coupled to front wheels 14 and rear wheels 16. The vehicle 10 may include a unibody construction, wherein the body 12 includes sheet metal skin support by a frame as is understood by those skilled in the art. A first passenger side door 18 is located between the front wheels 14 and rear wheels 16 and provides access to a passenger for sitting in a front seat of the vehicle adjacent to a driver.

The vehicle 10 may include a second passenger side door 20, shown in an open position, coupled to the unibody frame through a sliding mechanism including a plurality of tracks. Any number of tracks are possible, but in the illustrated embodiment of FIG. 1, there are three tracks shown. As will be described in this disclosure, a conventional sliding mechanism may be modified to slide along the tracks to increase the size or width of a door opening 22 to access the interior of the vehicle 10. The widened opening 22 thus may provide improved access to a physically limited passenger seated in a wheelchair or other assisted mobility devices. As shown in FIG. 1, the door opening 22 is defined on the sides thereof by an edge 19 of a B-pillar 23 and an edge 21 of the door 20. The conventional vehicle is further modified, as shown in one embodiment, to include a ramp assembly 24 which provides rolling access of a wheelchair from a ground surface 26 into or out of an interior 28 of the vehicle 10. The ramp assembly 24 may be installed at the opening 22 and is movable between the interior of the vehicle, where it may be stored in some embodiments, and the exterior for wheelchair access.

In some modified vehicles, such as the modified van shown in FIG. 1, the middle row of seats may be removed from the manufacturer supplied vehicle or any conventional vehicle to enhance the access to a wheelchair supporting a passenger. Once the wheelchaired passenger moves into the interior of the vehicle, the passenger or caregiver may position the wheelchair in the middle portion of the interior behind the driver and passenger seats of the front row. In some instances, the wheelchaired passenger may move from the wheelchair to the driver's position or to the front row passenger position. As used herein, a wheelchaired passenger is used to refer to an individual making use of a wheelchair.

Figure 2:
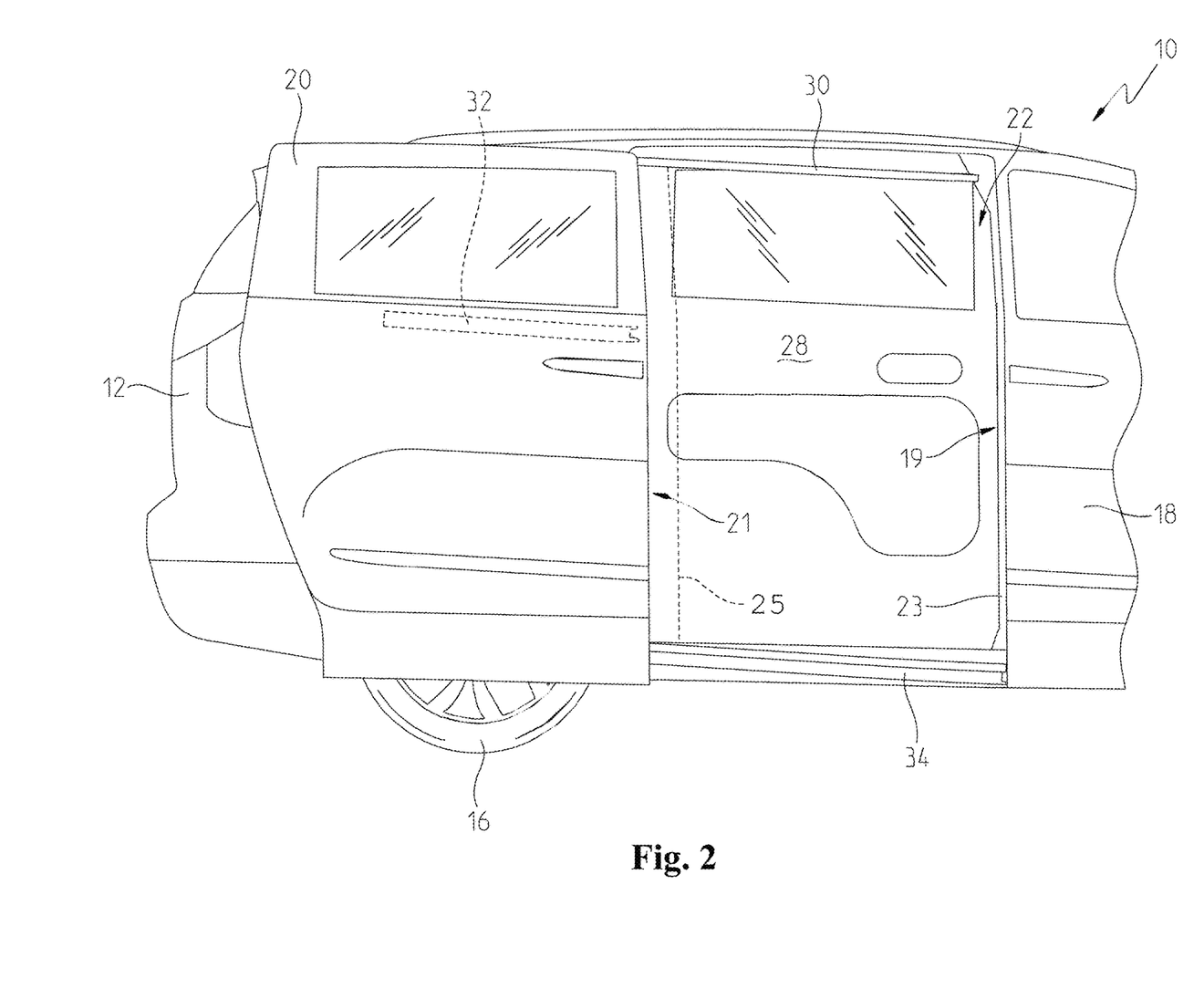
FIG. 2 illustrates an elevational side view of a passenger vehicle having a first, second, and third track adapted to provide for sliding movement of a door from a closed position to an open position.

As shown in FIG. 2, the vehicle 10 may include one or more tracks. In this embodiment, the vehicle 10 is shown having a first track assembly 30, a second track assembly 32, and a third track assembly 34, each of which may be adapted to provide sliding movement of the door 20 between a closed position and an open position. In other embodiments, the vehicle may include any number of tracks. In one embodiment, an upper portion of the vehicle body 12 may support the first track assembly 30 and a lower portion of the body 12 may support the third track assembly 34. In this way, the first track assembly 30 may be referred to as an upper track assembly and the third track assembly 34 may be referred to as a lower track assembly. The second track assembly 32 of the embodiment in FIG. 2 may also be supported by the body 12. However, in at least one embodiment, the second track assembly 32 may be positioned at a bottom portion of or below a side window. This side window may be the rearmost side window of the vehicle, or it may simply be any one of several side windows of the vehicle. In some embodiments, the second track assembly 32 may be hidden, either partially or completely by the side window.

It is further noted that the second track assembly 32 may be located between the first and third track assemblies. As such, the second track assembly 32 may be referred to as a mid or middle track assembly in this embodiment. In embodiments where there are only two track assemblies, the second track assembly 32 may be above or below the other track assembly. In at least the embodiment of FIG. 2, the first track assembly 30 may be located near a top or roof of the vehicle 10, whereas the third track assembly 34 may be located near a floor or bottom of the vehicle 10.

Figure 3:
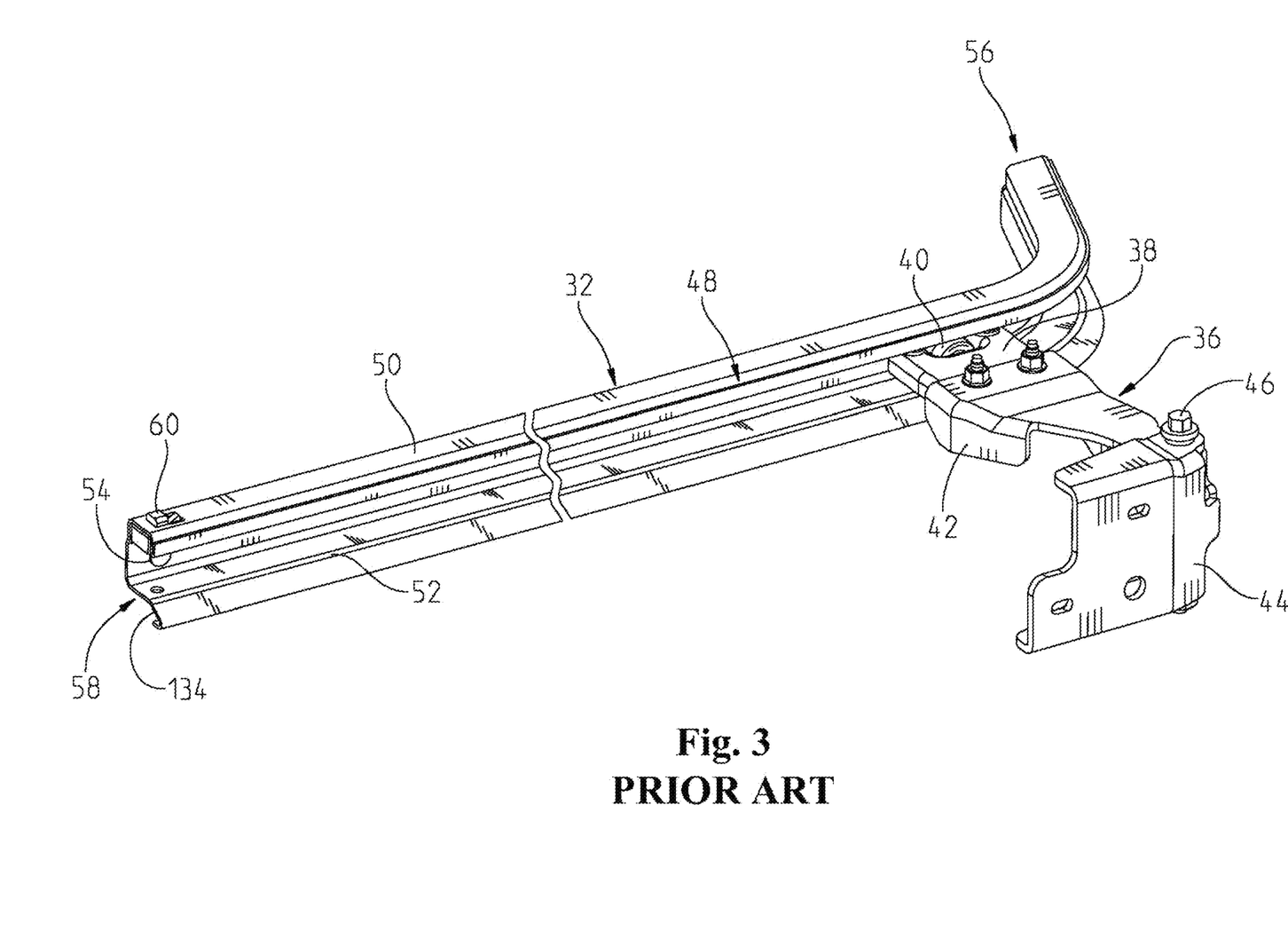
FIG. 3 illustrates a perspective view of an OEM door hinge coupled to an OEM door track.

In an OEM or conventional vehicle door, a sliding door hinge 36, such as the sliding door hinge 36 of FIG. 3, may be coupled to an interior of the door 20 and is slidingly coupled to the second track assembly 32. The conventional sliding door hinge 36 may include a sliding member 38 which engages the track assembly 32 with a plurality of roller bearings, such as the one roller bearing 40 which is shown in FIG. 3. A bracket support 42, coupled to the sliding member 38, locates the door 20 at an appropriate spaced away from or offset from the body 12 of the vehicle 10 to allow the door 20 to move freely without interference from the vehicle body 12. A door bracket 44 may be pivotally coupled to the bracket support 42 about a pin 46 which enables pivotal movement of the bracket 44 about an axis defined through the pin 46 with the bracket support 42. The door bracket 44 includes a plurality of apertures for connectors to connect the sliding door hinge 36 to an inside of the door 20. Other conventional structures are possible in conventional vehicles for connecting a sliding vehicle door to the body 12 of the vehicle 10, but the embodiment of FIG. 3 is one such embodiment.

Moreover, the conventional second track assembly 32 includes a rail 48, which in one embodiment may be a U-shaped or C-shaped channel, including a rail top flange 50, a rail bottom flange 52, and a rail web 54 extending between the top flange 50 and the bottom flange 52. The rail web 54 may be a back or rear wall of the track assembly 32.

In one embodiment, the rail 48 may be formed of a metal, such as an extruded sheet metal. The sliding member 38, and consequently the door hinge 36, slidingly moves along the rail 48 between a first end 56 and a second end 58. A hinge stop 60, located at or near the second end 58, prevents the door hinge 36 from moving any further in a rearward direction (i.e., in a direction toward the rear of the vehicle) than allowed by the hinge stop 60. In other words, the hinge 36 may contact the hinge stop 60 to limit or prevent further rearward movement. In effect, the door stop 60 defines the end of rearward travel and thus the fully open position of the door 20. Moreover, this also defines the maximum width of the door opening with the conventional track assembly 32 and door hinge 36 combination.

In an OEM or other conventional vehicle, a plurality of sliding door hinges may be coupled to the inside of the door 20 such that each engages with one of the tracks 30, 32, and 34 formed in or coupled to the vehicle 10. The sliding door hinge 36 is typically located at the track assembly 32. Different types of sliding door hinges are configured to engage the tracks 30 and 34. When the described hinges are used in the OEM or other conventional vehicle, however, the size or width of the opening 22 is defined between the edge 19 of the B-pillar 23 and the edge 21 of the door 20 which can open no further than an axis 25 as illustrated by the dotted line in FIG. 2. The door 20 is shown in FIG. 2 having moved further rearward than the axis 25 due to the modified track assembly described herein. In any event, in this OEM configuration, the size or width of the door opening 22 may be insufficient or too narrow to provide adequate access to enter or exit the vehicle 10 by a wheelchaired individual. Thus, there is a need for a modified vehicle in which one or more of the track assemblies is modified to increase the width of the door opening 22.

In one embodiment, to increase the width or access area of the door opening 22, the second or middle track assembly 32 may be modified as illustrated in FIGS. 4-8. For example, in some embodiments, the conventional hinge stop 60 may be removed from the rail 48. A track extension 70 may be positioned at the second end 58 of the second track assembly 32 where it may be coupled to the body 12 of the vehicle 10. For example, in one embodiment, an extension body 71 may be coupled to sheet metal 72 via one or more connectors 74. In some embodiments, the sheet metal 72 may be part of the vehicle body 12, but it is not limited to this. In another embodiment, the track extension body 71 may be coupled to the sheet metal 72 via an adhesive or by connectors and the adhesive. The adhesive may comprise, for example, one or more of a glue, an adhesive tape, an epoxy, pressure sensitive adhesives, and a spray adhesive. In an alternative embodiment, the track extension body 71 may be welded or fixedly coupled to the sheet metal 72. While FIG. 4 references only the second track assembly 32, the present disclosure is not limited to extending only the second track assembly 32. Instead, in other embodiments, the first and/or third track assembly may also be capable of being extended with a similar track extension. For example, in one embodiment, the second track assembly 32 and one or both of the first and third track assemblies may be extended.

The track extension body 71 may include an extension top flange 76, an extension bottom flange 78, and an extension web 80 which extends between the top flange 76 and the bottom flange 78. The extension web 80 may be a back or rear wall of the extension body 71. The extension body may be formed of a steel, titanium, or aluminum material. In one example, the body 71 may be formed of a material similar to that of the second track assembly 32. In another example, the extension body 71 may be manufactured by a three-dimensional (3D) printing process. Other processes known to one skilled in the art may also be implemented to produce the extension body.

Figure 4:
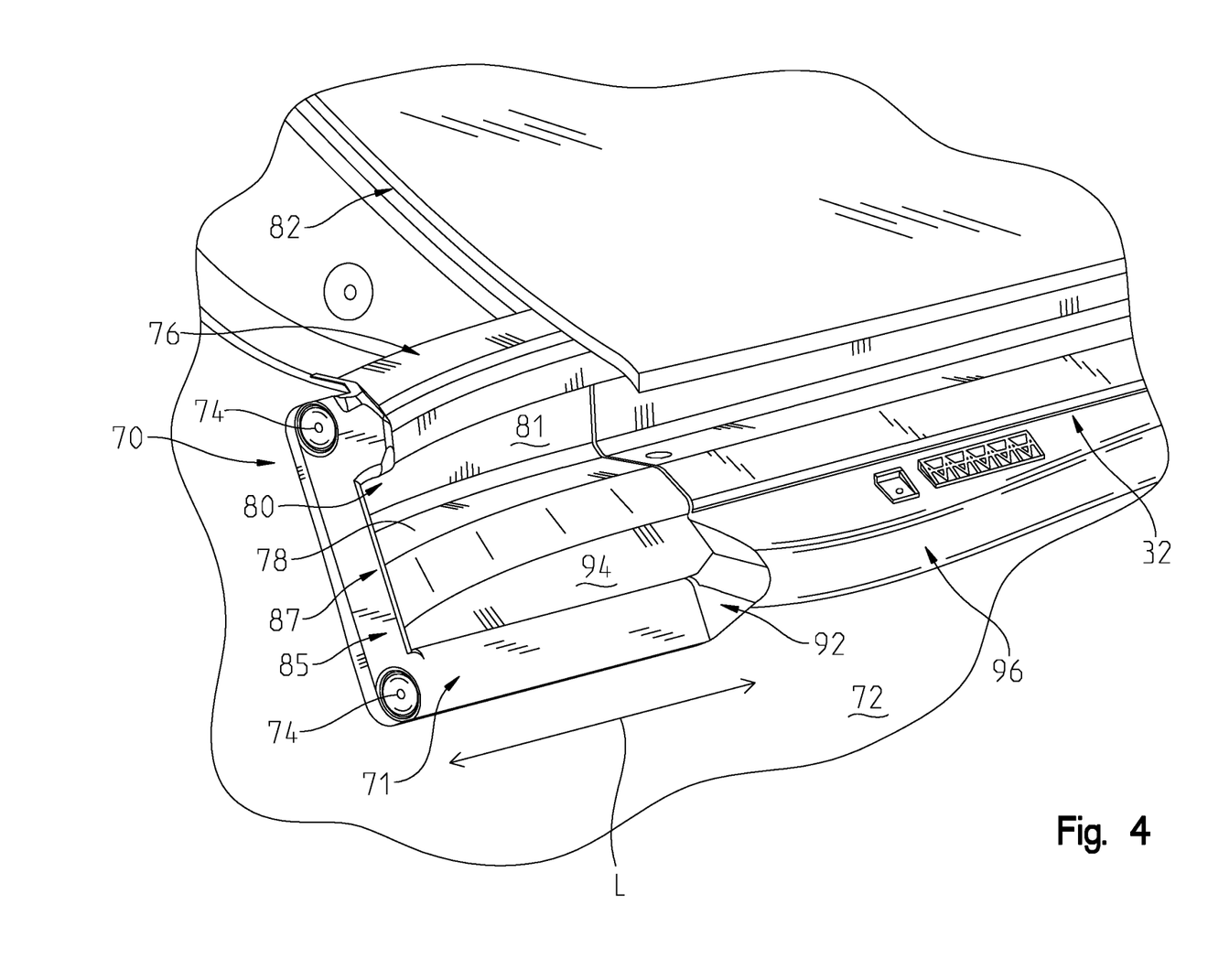
FIG. 4 illustrates a perspective view of a track extension arranged at the end of a door track.

The extension top flange 76 may be located adjacently to the rail top flange 50 and the extension bottom flange 78 may be located adjacently to the rail bottom flange 52. In some embodiments, the extension top flange 76 may be at least partially coplanar with the rail top flange 50. In further embodiments, the extension bottom flange 78 may be at least partially coplanar with the rail bottom flange 52. The extension web 80 may be located adjacently to the rail web 54. In one embodiment, the extension web 80 may be at least partially coplanar with the rail web 54. The extension top flange 76, the extension bottom flange 78, and the extension web 80 may define an extension channel 81, as shown in FIG. 4. Each end portion of the extension flanges 76, 78 and the extension web 80 may be positioned with respect to the rail flanges and rail web to provide an interface that enables a smooth transition of the door hinge 36 between the rail 48 and the track extension 70. The addition of the track extension 70 to the conventional track assembly 32 extends the overall length of the second track assembly 32 to support further rearward movement of the hinge 36, and thus the door 20, with respect to the vehicle body 12. In other words, as the hinge 36 moves or slides along the track assembly 32 toward the rear of the vehicle, the extension 70 increases the sliding distance or rearward travel of door 20. In effect, this additional movement of the door enlarges the width or size of the door opening 22.

Figure 5:
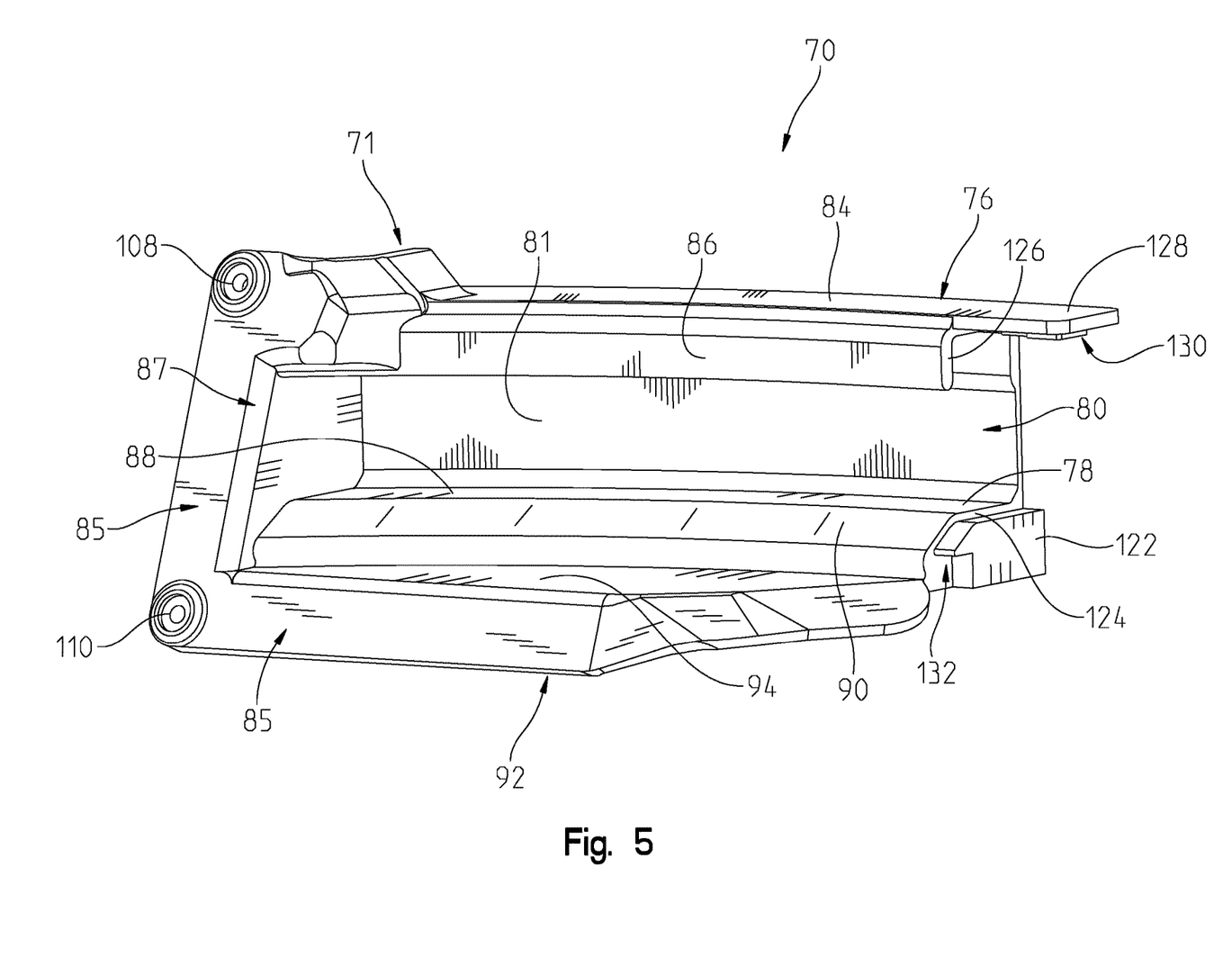
FIG. 5 illustrates a front perspective view of a track extension.

As shown in both FIGS. 4 and 5, each of the extension top flange 76, the extension bottom flange 78, and the extension web 80, may be curved with respect to the rail 48 which is generally linear along its length as illustrated in FIG. 3. As the hinge 36 moves along the rail 48 from the second end 58 of the conventional track assembly 32 to the track extension 70, the curved configuration of the extension body 71 induces the hinge 36 to move from generally below a rear or side window 82 (see FIG. 4) toward a position along and supported by the sheet metal 72. A length L of the extension body 71 may define an additional length of travel of the door 20 and therefore increase the width or size of the door opening 22. While the extension 70 is intended to lengthen the OEM or conventional second track assembly, a portion of which is hidden by the window 82, in some embodiments the extension 70 may be adapted to lengthen other types of rails including those hidden completely or partially by other vehicle panels or those not hidden by a window.

As shown in FIG. 5, the extension top flange 76 may include a first portion 84, or rim, that extends generally perpendicular from the web 80 and a second portion 86, or lip, that extends generally downward from and perpendicular to the first portion 84. The first portion 84 and the second portion 86 may define a space with the web 80 that provides a barrier or guide for the roller bearing 40 to keep the hinge 36 on the track as the hinge 36 travels along the extension body 71. The track extension body 71 may also include a front portion 85 defining a relatively planar surface, wherein the front portion 85 includes a terminating end 87 of the extension channel 81. The curved configuration of the track extension 70 may define a distance between the inside of the door and the sheet metal 72 or vehicle body. As the hinge 36 moves along the extension channel 81, the door 20 moves further away from the door opening 22 and the body 12, which therefore increases the size or width of the opening 22. As the hinge 36 moves toward the terminating end 87, the curve defined by the channel 81 may include a steeper incline to move the door 20 to its furthest location away from the body 12. The curved configuration of the channel 81 can move the door 20 outward or away from the side of the vehicle 10 and towards the end of travel such that the interior panel of the door 20 clears the exterior of the vehicle's quarter panel. In one embodiment, the door may open an additional 5 inches towards the rear of the vehicle 10 which in turn widens the door opening 22 by about 5 five or so inches. In another embodiment, the door 20 may open by at least one or more inches such that the door opening 22 is increased by the at least one or more inches. In other embodiments, the door 20 may open by at least three or more inches such that the door opening 22 is increased by the at least three or more inches. In a further embodiment, the door 20 may open by at least six or more inches such that the door opening 22 is increased by the at least six or more inches. In yet another embodiment, the door 20 may open by at least nine or more inches such that the door opening 22 is increased by the at least nine or more inches. Thus, the increase in width of the door opening 22 may be approximately the same as the increase or length of travel provided by the track extension 70.

The extension bottom flange 78 may include a generally planar surface 88 that supports the hinge 36, and in particular, the rollers of the hinge 36. The extension bottom flange 78 may further include an inclined surface 90 that extends from the planar surface 88 in an inclined or angled relationship or direction. The inclined or angled surface 90 may provide additional support to the hinge 36 as it moves along the extension body 71. An extension shelf 92 may extend from the extension bottom flange 78 and define a surface 94 which is generally parallel to the planar surface 88. The extension shelf 92 may be located adjacent to a vehicle shelf 96 (see FIG. 4). While the hinge 36 may not engage the extension shelf 92, the extension shelf may still provide structural support for the extension body 71. An underneath side 97 (see FIG. 6) of the shelf 92 may include a configuration shaped to engage the vehicle shelf 96, such that the extension body 71 is stable when the hinge 36 moves along the extension body 71.

Figure 6:
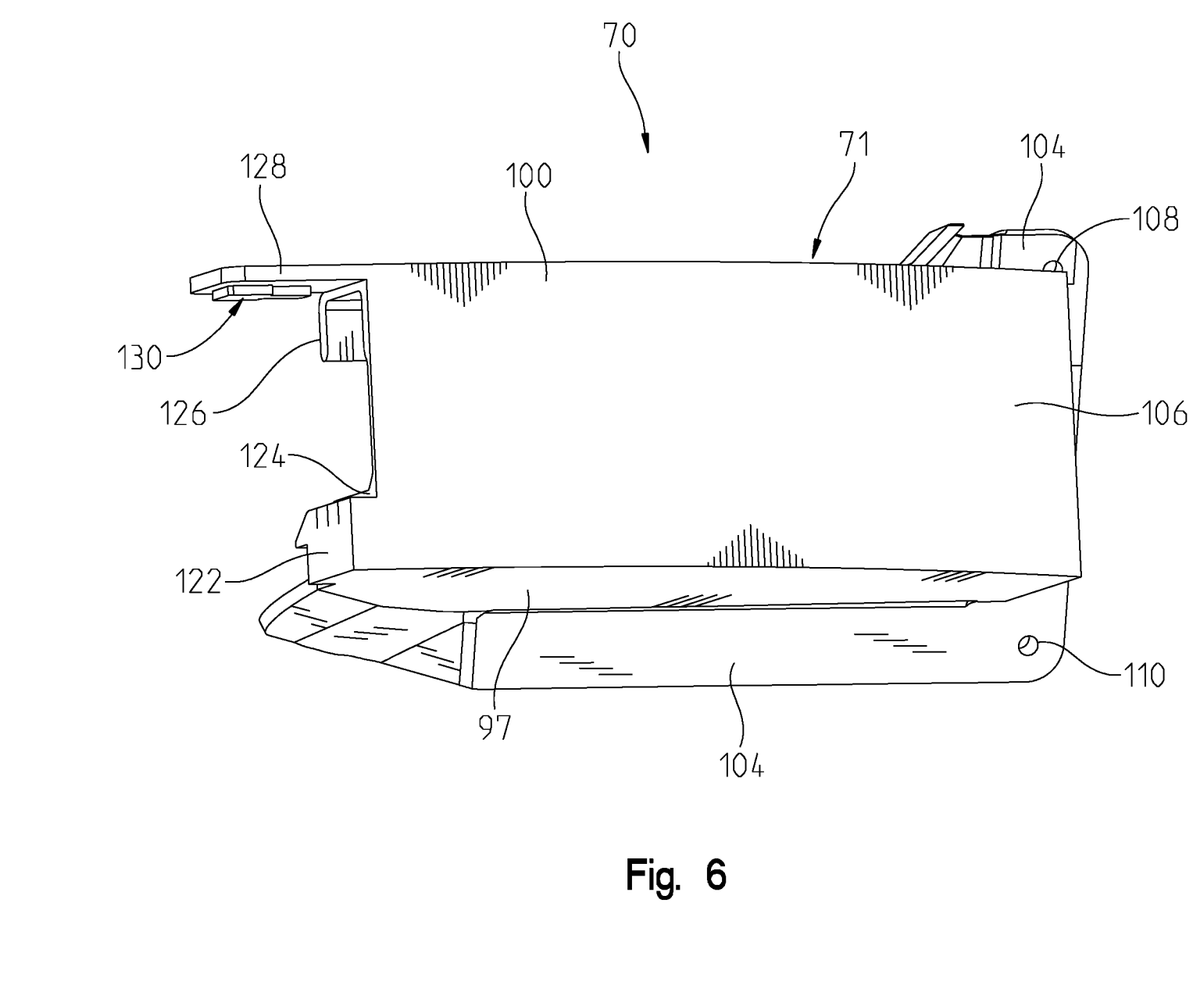
FIG. 6 illustrates rear perspective view of a track extension.

FIG. 6 illustrates the backside of the track extension body 71 including a rear portion 100 that is configured to be inserted into an opening 102 of the body 12 of vehicle 10. (see FIG. 7). As shown in FIG. 6, the front portion 85 of the track extension body 71 may be configured as a flange 104 extending from the underneath side 97 as well as extending from a side portion 106. A first aperture 108 and a second aperture 110 may be defined in the flange 104 to receive connectors 74. The flange 104 may be configured to fit to the body 12.

Figure 7:
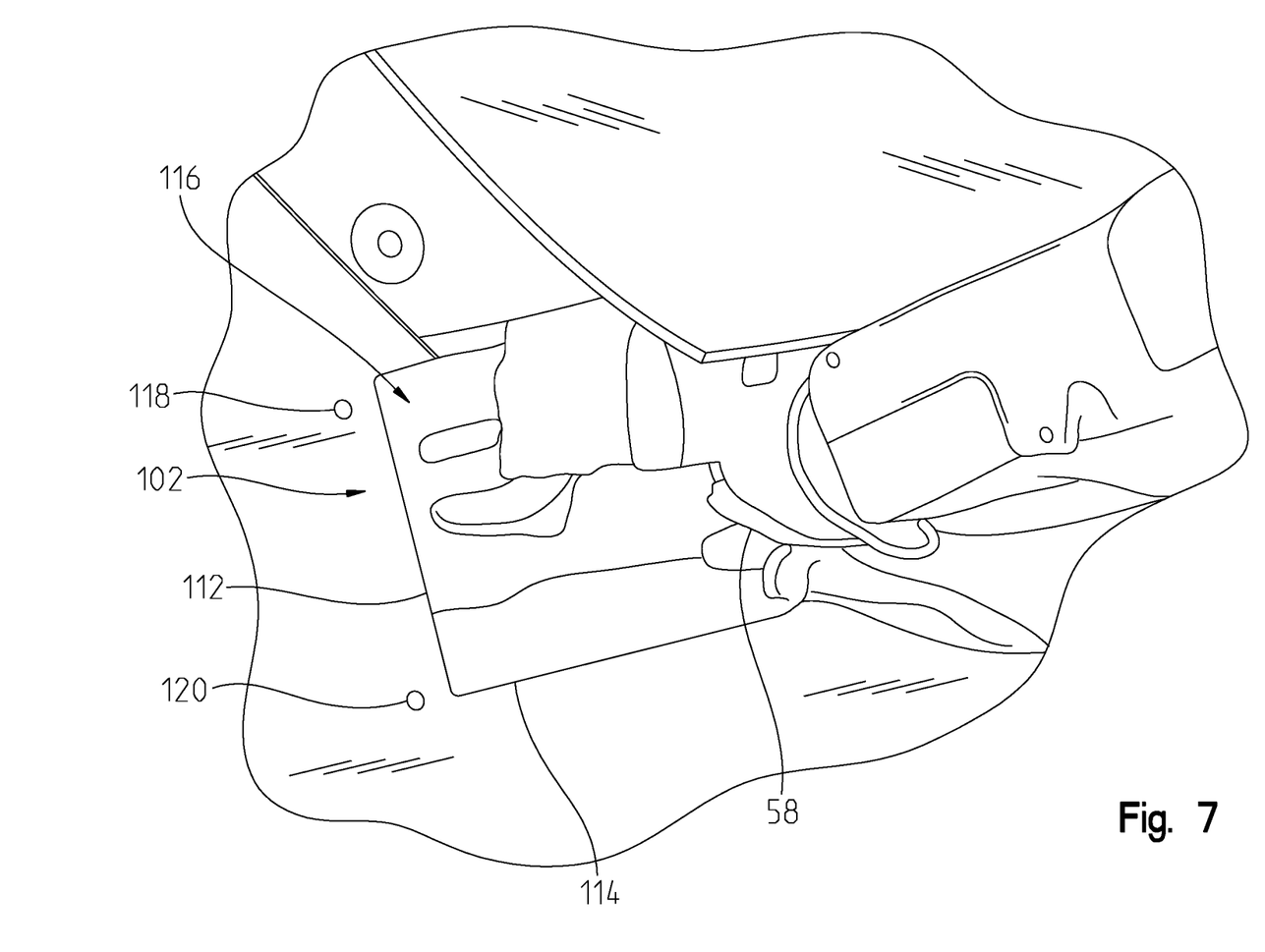
FIG. 7 illustrates a portion of a vehicle body being prepared to support a track extension.

In FIG. 7, a portion of the car body 12 is illustrated being prepared to support the extension 70. The opening 102 is made in the sheet metal of the body 12 to receive the rear portion 100 of the extension body 71. In one embodiment, the rear portion 100 is a projecting or protruding part having a generally rectangular shape configured to fit within the opening 102. The opening 102 is located at the end 58 of the track assembly 32. The opening 102 may include at least a first side 112 and a second side 114, each of which may be generally linear, and configured to contact the edges of the rear portion 100 of the extension body 71. An interface between the rear portion 100 and sides 112 and 114 of the opening 102 may provide a relatively stable or close fit for the track extension 70. The car body 12 may include an interior frame 116, as is understood by one skilled in the art. A first aperture 118 and a second aperture 120 are formed in the sheet metal to receive the connectors 74 of FIG. 4 to hold the extension body 71 in place to the body 12. In one embodiment, the connectors may be rivets, screws, bolt, or other fastener. In another embodiment, the extension body 71 may be held in place by a connector or fastener (not shown) extending through the interior frame 116 and into the rear portion 100 of the extension body 71 to complete the track extension 70.

The extension body 71 may be located in the opening 100 such that an alignment portion 122 (see FIG. 5) of the bottom flange 78 is located beneath the rail bottom track 52, which at least partially supports the rail 48. A ledge 124, located between the alignment portion 122 and the surface 88, may define an abutting surface that engages the rail 48. In this embodiment, the extension body 71, when located in the opening 102, may be blocked or at least comes into contact with respect to the rail 48. The ledge 124, therefore, may provide a locator to insure accurate placement of the extension 70 with the track assembly 32. A terminating end 126 of the lip 86 additionally provides a locating feature to provide proper placement of the extension 70 with respect to the track assembly 32. A projecting portion or projection 128 of the rim 84 may extend from the rim 84 and be located over or above the rail top flange 50. The projection 128 may also provide support for the rim 84. In one embodiment, the rim 84 may include a tab 130 configured to engage an aperture previously supporting the hinge stop 60, which is removed during the modification of the track assembly 32 with the extension 70.

Figure 8:
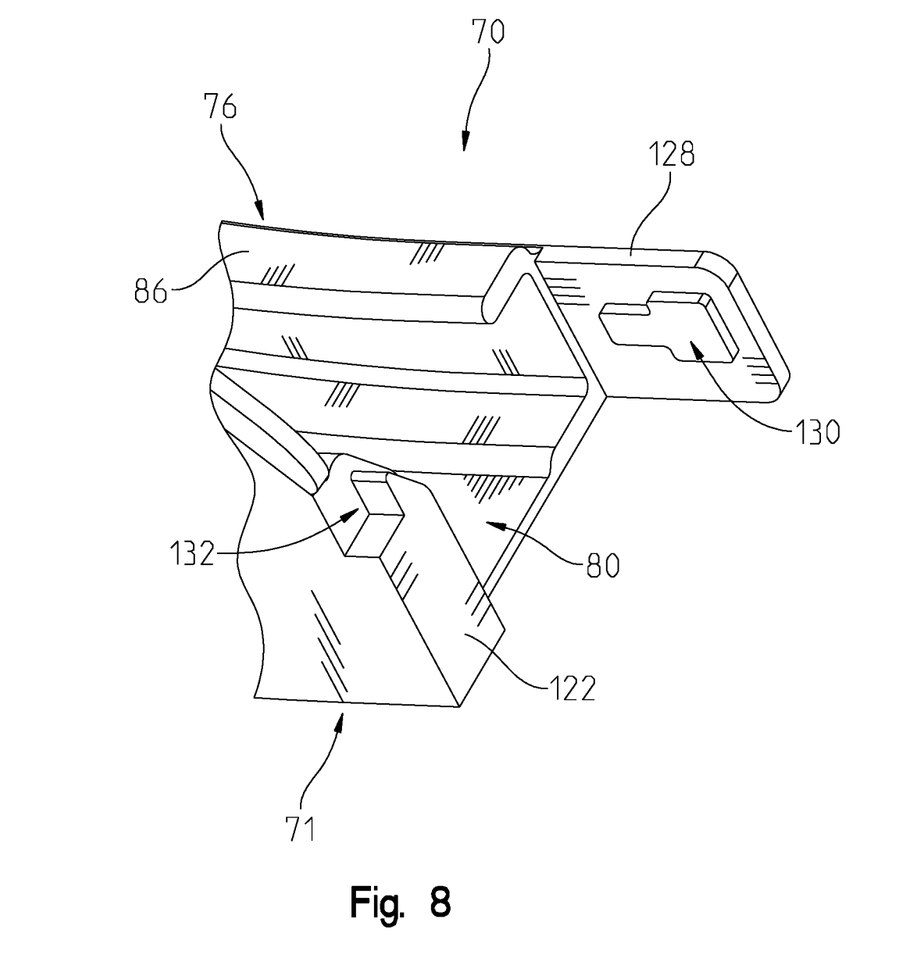
FIG. 8 illustrates a partial perspective front view of a track extension.

As shown in FIG. 8, the tab 130 may include sides that extend downwardly from a bottom surface of the projection 128. The tab 130 includes an outline having a similar or same shape as the aperture that previously supported the hinge stop 60. As further shown in FIG. 8, the alignment portion 122 may include a hook portion 132 that is configured to engage the second end 58 of the rail 48. When the extension body 71 is moved to engage the rail 48, the hook portion 132 may be inserted into a folded portion 134 (see FIG. 3) of the bottom flange 52. The alignment portion 122 therefore supports the bottom flange 52 and thus the rail 48.

As described herein, the track extension 70 may include the extension body 71 and the associated connectors, thereby providing a solution to increase the size or width of a vehicle door opening 22 using a reduced numbers parts. The track extension 70 may reduce the time and effort to retrofit an OEM or other vehicle with a conventional track assembly. Moreover, replacement and repair issues may also be reduced. Thus, the cost of retrofitting or modifying an OEM or other conventional vehicle may be reduced.

While exemplary embodiments incorporating the principles of the present disclosure have been disclosed herein, the present disclosure is not limited to the disclosed embodiments. Instead, this application is intended to cover any variations, uses, or adaptations of the disclosure using its general principles. For instance, the present disclosure is not limited to the modification of a purchased OEM vehicle, but can be incorporated into the OEM or any other conventional vehicle when manufactured. Further, this application is intended to cover such departures from the present disclosure as come within known or customary practice in the art to which this disclosure pertains and which fall within the limits of the appended claims.

The invention claimed is:

1. A vehicle, comprising:
    a body;
    a door including a coupling mechanism to move the door relative to the body between a closed position and an open position;
    a track assembly defining a channel, the channel having a first end and a second end;
    a track extension fixedly coupled at the second end of the channel, the track extension defining an extension channel configured to be aligned with the channel of the track assembly;
    wherein, the extension channel defines a third end;
    wherein, the coupling mechanism is configured to move along the channel and extension channel, the coupling mechanism moving from the second end of the channel to the third end of the extension channel to increase a distance of travel of the door relative to the body.

2. The vehicle of claim 1 wherein the track extension comprises an extension body having a top flange and a bottom flange, the extension channel being located between the top flange and the bottom flange.

3. The vehicle of claim 2, wherein the extension body comprises a curvature at a location between the second end and the third end.

4. The vehicle of claim 2, wherein the track extension comprises a front portion having a generally planar surface, the front portion defining the third end of the extension channel.

5. The vehicle of claim 4, wherein the track extension comprises a shelf disposed between the front portion and the bottom flange, the shelf defining a surface which is generally parallel with an upper surface of the bottom flange.

6. The vehicle of claim 5, wherein the top flange comprises a rim disposed generally parallel to the upper surface of the bottom flange.

7. The vehicle of claim 1, wherein the track extension comprises a plurality of apertures configured to receive one or more connectors for coupling the track extension to the body.

8. The vehicle of claim 1, wherein the body comprises an opening for receiving the track extension.

9. The vehicle of claim 1, wherein the track extension comprises an alignment portion located at an end of the track extension opposite the third end, the alignment portion being positioned below the track assembly.

10. The vehicle of claim 9, wherein the alignment portion comprises a hook portion configured to engage the track assembly near the second end of the channel.

11. A method of modifying a vehicle having a body, a door, a door opening formed in the body, a door track having a first end and a second end, and a coupling mechanism configured to move along the door track to move the door between a closed position and an open position, the method comprising:
    providing a track extension including an extension body, a top flange, a bottom flange, and an extension channel;
    inserting the track extension into an opening formed in the body of the vehicle;
    aligning the track extension with the door track; and
    fixedly coupling the track extension to the body to form a continuous channel between the door track and the extension channel.

12. The method of claim 11, further comprising positioning an alignment portion of the extension body below a portion of the door track.

13. The method of claim 11, wherein the coupling step comprises abutting a ledge portion of the bottom flange with the second end of the door track.

14. The method of claim 12, wherein the coupling step comprises engaging a hook portion of the alignment portion with the second end of the door track.

15. The method of claim 11, wherein the coupling step comprises positioning a projecting portion of the top flange over a portion of the door track.

16. A vehicle, comprising:
- a body including an opening for access to an interior thereof;
- a door for selectively covering the opening, the door configured to move relative to the body between a closed position and an open position;
- a track assembly having a first end and a second end, the door being in the closed position when located at the first end and the door being in a partially open position when located at the second end;
- a track extension fixedly coupled to the second end of the track assembly such that the track extension is aligned with the track assembly to enable a smooth transition of the door between the track assembly and the track extension;

wherein, the door is in the open position when located at a terminating end of the track extension.

17. The vehicle of claim 16, wherein the opening comprises a first width when the door is in the partially open position and a second width when the door is in the open position, the second width being greater than the first width.

18. The vehicle of claim 16, wherein:
- the track assembly is formed in the body;
- the track extension is disposed within an opening formed in the body.

19. The vehicle of claim 16, wherein the track extension comprises an extension body having a top flange and a bottom flange, the track extension defining a first channel located between the top flange and the bottom flange.

20. The vehicle of claim 19, wherein the track assembly defines a second channel between the first end and the second end, the first channel and second channel being aligned and generally coplanar with one another.

* * * * *